Patented June 20, 1933

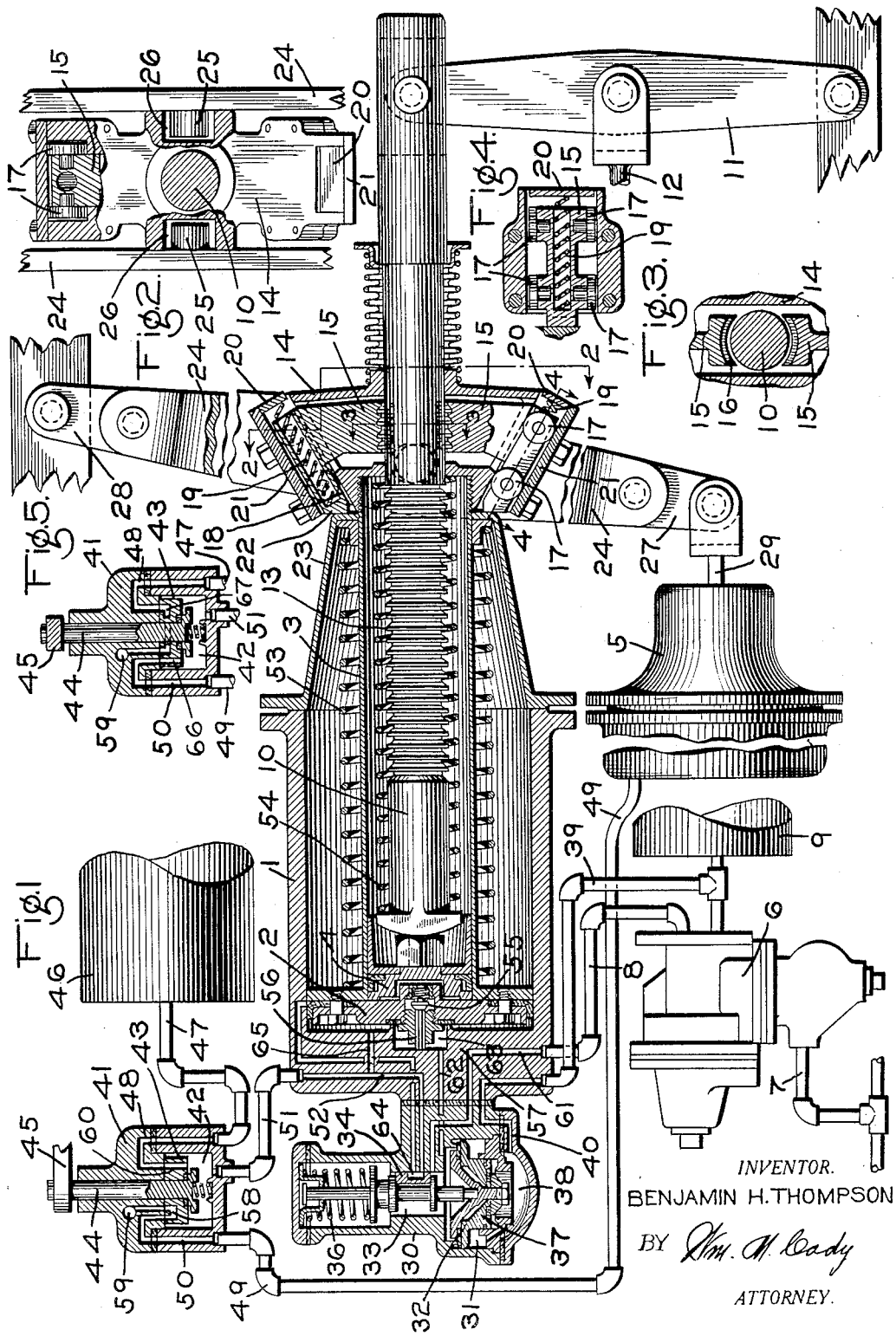

1,914,624

UNITED STATES PATENT OFFICE

BENJAMIN H. THOMPSON, OF ARDARA, PENNSYLVANIA, ASSIGNOR TO THE WESTING-
HOUSE AIR BRAKE COMPANY, OF WILMERDING, PENNSYLVANIA, A CORPORATION
OF PENNSYLVANIA

BRAKE CYLINDER PISTON LOCK

Application filed May 29, 1931. Serial No. 540,862.

This invention relates to fluid pressure brakes, and more particularly to a brake equipment adapted to provide a higher braking force when the car is loaded than when the car is empty.

With empty and load brake equipment it has heretofore been proposed to provide two or more brake cylinders, the brake cylinder piston of one brake cylinder being first operated to cause the brake shoes to engage the wheels, and then another brake cylinder piston is operated to increase the force with which the brake shoes engage the wheels. In order to prevent unnecessary movement of the second brake cylinder piston while the first brake cylinder piston is moving out to apply the brakes, a clutch device is employed which automatically connects the second brake cylinder piston to the brake rigging when the second brake cylinder piston moves out.

The clutch above referred to is a vital element of the apparatus and should the clutch fail, the brakes could not be applied with the power of the second brake cylinder.

The principal object of my invention is to provide an improved clutch device of the above character, which is reliable in action and which acts promptly, as soon as the second brake cylinder piston starts its brake applying movement.

In the accompanying drawing; Fig. 1 is a diagrammatic view, partly in section, of an empty and load brake equipment embodying my invention; Fig. 2 a section on the line 2—2 of Fig. 1; Fig. 3 a section on the line 3—3 of Fig. 1; Fig. 4 a section on the line 4—4 of Fig. 1; and Fig. 5 a sectional view of the change-over valve device, showing the same in the load position.

According to the construction shown in Fig. 1, three brake cylinders are employed, namely a brake cylinder 1, containing a piston 2, which is operated to apply the brakes when the car is empty or unloaded, a take-up brake cylinder, which may be formed as a cylinder 3 carried by the empty car brake cylinder piston 2, and containing a take-up piston 4, for initially moving the brake rigging so that the brake shoes engage the wheels before the brake cylinder piston 2 moves out, and a brake cylinder 5, which is cut into operation only when the car is loaded.

A triple valve device 6, connected to the brake pipe 7, controls the supply and release of fluid under pressure to and from the brake cylinders by way of pipe 8, in the usual manner, the usual auxiliary reservoir 9 being associated with said triple valve devices.

Within the cylinder 3 is disposed a piston rod 10 adapted to operatively engage the piston 4, and said rod is operatively connected, through a brake lever 11 with a rod 12 of the usual brake rigging. The piston rod 10 is provided with a series of annular teeth 13.

According to my invention, the clutch mechanism comprises a casing 14 which is secured to the outer end of the take-up cylinder 3 and housed in said casing are a pair of jaws 15 having teeth 16 adapted to cooperate with the teeth 13 on the rod 10. The jaws 15 are preferably provided with guide rollers 17 which operate on inclined runways 18 provided in the casing 14 and each jaw has a recess for a coil spring 19, the outer end of the springs engaging a plate 20 carried by a cover plate 21, so that the springs 18 urge the jaws toward the left, as viewed in Fig. 1. A projecting end portion 22 of each jaw is adapted to engage the outer end face of the non-pressure head 23 of the brake cylinder 1.

The casing 14 is operatively connected to the load brake cylinder 5 through a yoke lever comprising spaced side members 24 provided with trunnions 25 adapted to engage in recesses 26 provided in the casing 14, as shown in Fig. 2. The outer ends of the members 24 are brought together and secured to end pivot members 27 and 28. The member 27 being connected to the piston rod 29 of the load brake cylinder 5 and the member 28 being fulcrumed on a portion of the car, so that when the piston of the load brake cylinder 5 is moved out, the movement is transmitted through said yoke lever and the casing 14 to the brake cylinder 3, which also serves as the piston rod of the empty brake cylinder piston 2.

For controlling the cutting in of the empty brake cylinder 2, after the take-up brake cylinder piston 4 has moved out, a transfer valve device 30 is provided comprising a casing having a piston chamber 31, containing a piston 32 and a valve chamber 33 containing a slide valve 34 adapted to be operated by piston 32. The movement of piston 32 in one direction is opposed by a spring 36 and the piston 32 is provided with a guide portion 37 adapted to seat upon movement of the piston in one direction, the piston 32 also seating upon extreme movement in the opposite direction. When the portion 37 is unseated, fluid can flow from chamber 38 to chamber 31. Chamber 38 is connected to the auxiliary reservoir 9 through pipe 39 and passage 40.

A change-over valve device 41 is provided for adusting the apparatus to provide braking power either for an unloaded or empty car or for a loaded car, and comprising a casing having a valve chamber 42 containing a rotary slide valve 43. The valve 43 is provided with a stem 44 to which is secured an operating member 45, which member may either be operated by hand or automatically as disclosed in the pending application of Joseph C. McCune, Serial No. 529,011, filed April 10, 1931.

A volume reservoir 46 is connected to a pipe 47 and passage 48 leading to the seat of the valve 43, the load brake cylinder 5 is connected to a pipe 49 and passage 50 leading to the seat of said valve, and the valve chamber 42 is connected to a pipe 51 and passage 52, leading to the seat of slide valve 34.

A release spring 53 urges the empty brake cylinder piston 2 to its inner position, as shown in Fig. 1 and a release spring 54 urges the piston rod 10 and the take-up piston 4 to their inner positions.

With the empty brake cylinder piston 2 in its inner position, a check valve 55 is held unseated, by the engagement of the stem 56 of the valve with the inner wall of the brake cylinder pressure head 57.

With the auxiliary reservoir 9 charged with fluid under pressure, fluid is supplied through pipe 39 and passage 40 to chamber 38 and causes the guide portion 37 to unseat, when the auxiliary reservoir pressure is sufficient to overcome the pressure of spring 36. Thus, normally, the piston 32 is maintained at its upper seat, as shown in Fig. 1, by auxiliary reservoir pressure acting in chamber 31.

If the change-over valve device 41 is set for braking an empty car, as shown in Fig. 1, the load brake cylinder is connected to the atmosphere, through pipe 49, passage 50, cavity 58 in rotary valve 43 and atmospheric exhaust port 59. In the empty position, a port 60 in the rotary valve 43 connects valve chamber 42 with passage 48, so that the volume of chamber 46 is added to that portion of the empty brake cylinder 1, at the pressure side of the piston 2.

If, with the apparatus set for braking an unloaded car, as above described, the brake pipe pressure is reduced so as to effect an application of the brakes, the triple valve device 6 will be operated in the usual manner to supply fluid under pressure from the auxiliary reservoir 9 to pipe 8. With the transfer valve device 30 maintained in the position shown in Fig. 1, by auxiliary reservoir pressure in chamber 31, the passage 61 leading to the pipe 8 is uncovered, so that fluid under pressure from pipe 8 is supplied to valve chamber 33. From valve chamber 33, fluid flows through passage 62 to chamber 63, and thence past the unseated check valve 55 to the chamber at the left of the take-up piston 4.

The piston 4 is then shifted to the right by fluid under pressure and the piston rod 10 is operated to shift the brake lever 11 and cause the brake rod 12 to operate the usual brake rigging, so as to cause the brake shoes to engage the wheels.

During this movement of the piston rod 10, the teeth of the jaws 15 are held out of engagement with the teeth 13 on the piston rod, since the jaws are held in this position by engagement of the projecting portions 22 of the jaws 15 with the end wall of the non-pressure head 23.

The auxiliary reservoir pressure is reduced by flow to the take-up brake cylinder and at the same time, the fluid pressure is built up in valve chamber 33 and when the pressure of fluid supplied to the brake cylinder and acting in valve chamber 33 plus the pressure of spring 36 slightly exceeds the auxiliary reservoir pressure acting on the opposite side of piston 32, said piston will be moved outwardly to a position in which a cavity 64 in slide valve 34 connects passage 61 with passage 52. Fluid under pressure supplied by operation of the triple valve device 6 then flows through passage 52 and passage 65 to the piston chamber at the left of the empty brake cylinder piston 2 and thereby the piston 2 is shifted to the right. The cylinder 3 is moved outwardly with the piston 2 and the casing 14 carried by said cylinder is also moved, so that the jaws 15 are caused to move relatively to the casing 14 by the action of the springs 19.

Since the jaws are supported by the rollers 17 acting on the inclined runways 18, the jaws will move inwardly, so as to cause the teeth 16 to engage the teeth 13 of the piston rod 10. The engagement of the teeth 16 with the teeth 13 requires only a slight longitudinal relative movement of the casing 14, so that after a corresponding slight movement of the piston 2, the piston rod 10 is operatively connected to the piston 2, so that the pressure applied to piston 2 is transmitted through the piston rod 10 to the brake lever 11.

With the present construction, the auxiliary reservoir volume is such as to provide the desired brake cylinder pressure for the load brake cylinder, but since the same auxiliary reservoir is employed for the empty brake cylinder, the volume reservoir 46 is connected to the empty brake cylinder when the load brake cylinder is cut out, the volume of the volume reservoir 46 being such that the auxiliary reservoir will equalize into the combined volumes of the volume reservoir and the empty brake cylinder, at substantially the same pressure as the auxiliary reservoir equalizes into the load brake cylinder.

When the empty brake cylinder piston 2 moves out, the check valve 55 is permitted to seat, so that fluid under pressure is trapped within the take-up cylinder 3.

To release the brakes, the brake pipe pressure is increased and the triple valve device 6 is operated in the usual manner to release fluid under pressure through the pipe 8 by way of the usual triple valve exhaust.

Fluid then flows from the chamber at the left of the empty brake cylinder 2, through passage 62 to valve chamber 33, and thence to the exhaust by way of passage 61 and pipe 8.

When the piston 2 moves to release position, the check valve 55 is unseated by engagement of stem 56 with the end wall of the head 57, so that fluid in the take-up brake cylinder is now released.

For loaded cars the change-over valve device 41 is set in the position shown in Fig. 5, in which passage 50 is connected through a port 66 in the valve 43 with valve chamber 42, and in which the volume reservoir 46 is connected to exhaust port 59, through a cavity 67.

It will now be seen that in applying the brakes on a loaded car, fluid under pressure supplied by operation of the triple valve device flows through pipe 51 to valve chamber 42 and thence to the load brake cylinder 5, by way of port 66, passage 50 and pipe 49, as well as to the empty brake cylinder piston 2. Otherwise the operation is the same as hereinbefore described when the brakes are applied with the apparatus set for applying the brakes on an empty car.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In an empty and load brake, the combination with a brake cylinder, a piston in said cylinder, a piston rod operable by said piston and provided with teeth, a second brake cylinder, a piston in said second brake cylinder, the first brake cylinder serving as a piston rod for the second piston, of a casing carried by the first brake cylinder and provided with one or more inclined runways, and one or more jaws having teeth adapted to cooperate with the teeth on the piston rod and movable on said runways, relative movement of said jaws on said runways with respect to said casing causing movement of said jaws toward and away from said piston rod.

2. A clutch device comprising a rod having teeth, a casing through which said rod extends and provided with inclined runways, and one or more jaws mounted in said casing and movable on said runways and having teeth adapted to engage with the teeth on said rod, relative movement of the casing with respect to the jaws in one direction first causing movement of the jaws so that the teeth of the jaws engage the teeth of the rod and then movement of the jaws to move said rod axially and relative movement in the opposite direction causing the teeth of the jaws to disengage from the teeth of the rod.

3. A clutch device comprising a longitudinally movable rod provided with teeth, a longitudinally movable casing through which said rod extends, a pair of oppositely disposed inclined runways in said casing, and jaws movable on said runways and provided with teeth adapted to engage the teeth on said rod, movement of the casing relative to said jaws first operating said jaws to cause the teeth of the jaws to engage the teeth of said rod and further movement of the casing operating said jaws to move said rod axially.

4. A clutch device comprising a longitudinally movable rod provided with teeth, a longitudinally movable casing through which said rod extends, a pair of oppositely disposed inclined runways in said casing, jaws movable on said runways and provided with teeth adapted to engage the teeth on said rod, springs interposed between said jaws and said casing for opposing relative movement between said jaws and casing in one direction, movement of the casing relative to the jaws operating to cause the teeth of the jaws to engage the teeth on said rod and further movement of the casing then causing axial movement of the jaws and said rod.

5. A clutch device comprising a longitudinally movable rod provided with teeth, a longitudinally movable casing through which said rod extends, a pair of oppositely disposed inclined runways in said casing, jaws provided with teeth adapted to engage the teeth on said rod, and rollers carried by said jaws and adapted to roll on said runways, movement of the casing relative to the jaws operating to move the jaws radially to cause the teeth of the jaws to engage the teeth of said rod and further movement of the casing operating to move the jaws and thereby said rod in an axial direction.

In testimony whereof I have hereunto set my hand, this 25th day of May, 1931.

BENJAMIN H. THOMPSON.